Sept. 15, 1931.  M. CHARLES  1,823,255
HYDRAULIC BRAKING SYSTEM FOR AIRPLANES
Filed June 4, 1931  2 Sheets-Sheet 1

Inventor:
Maurice Charles
By Mauro + Lewis
Attorneys

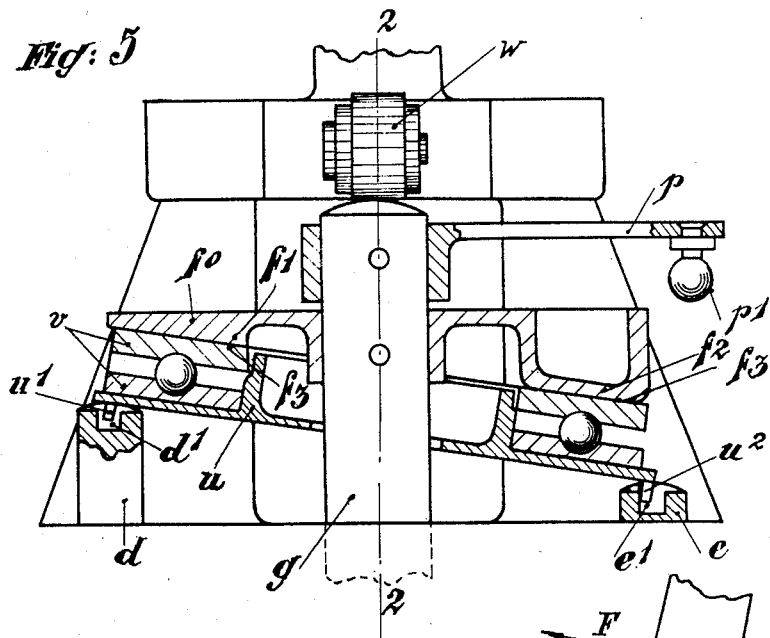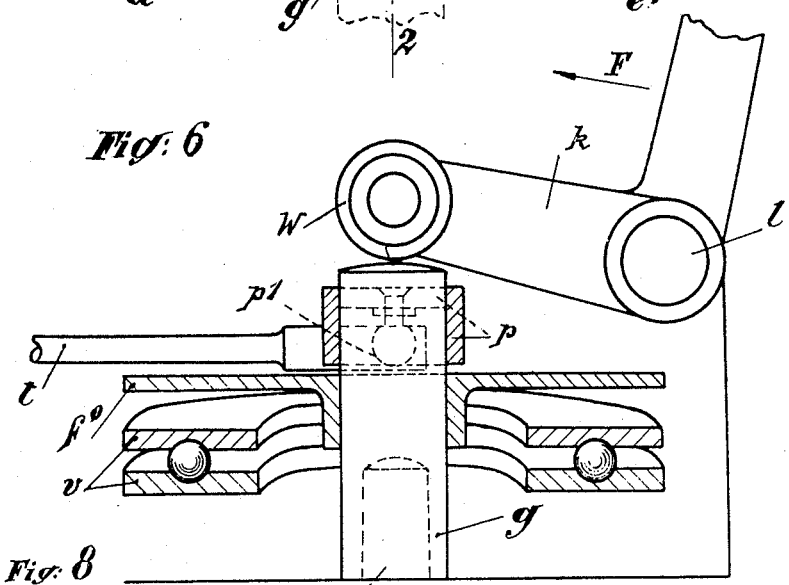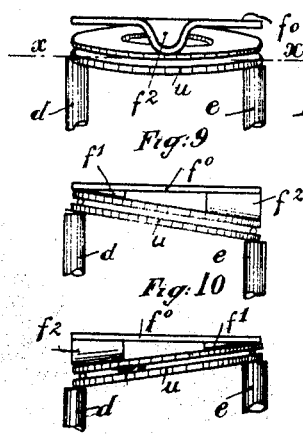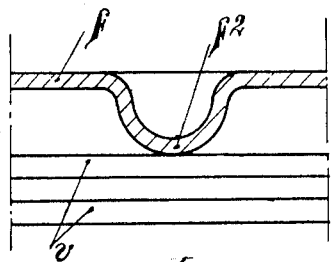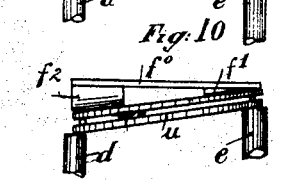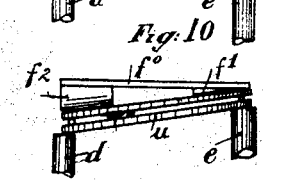

Patented Sept. 15, 1931

1,823,255

UNITED STATES PATENT OFFICE

MAURICE CHARLES, OF COURBEVOIE, FRANCE

HYDRAULIC BRAKING SYSTEM FOR AIRPLANES

Application filed June 4, 1931, Serial No. 542,175, and in France June 14, 1930.

There are hydraulic braking systems particularly adapted to be used in connection with motor vehicles and in which two elastic membrane or bellows force a liquid into two circuits corresponding respectively to the front wheels and to the rear wheels of said vehicle.

My present invention relates to braking systems for airplanes and its object is to provide a system in which the two generators control the wheel or the group of wheels on the right hand side of the airplane and the wheel or the group of wheels on the left hand side respectively, the two brakes being connected through a lever actuated by the pilot, and their relative adjustment being instantaneously varied by the displacements of the flight controlling foot-bar.

According to another embodiment of my invention the two brake rods are actuated by a cam-plate keyed on the shaft and comprising along a certain diameter two conical shaped bosses in line with one another disposed in contact with a thrust ball bearing which is interposed between said plate and the two brake rods. Said cam-plate is angularly driven by the direction foot-bar so as to place its bosses either simultaneously on the two rods, in two symmetrical inclined positions (corresponding to the braking during a curve) or at right angles to the plane of said rods (corresponding to the braking during a rectilinear motion).

Preferred embodiments of my invention will be hereinafter described with reference to the accompanying drawings, given merely by way of example, and in which:

Fig. 5 is a partial section of another embodiment of my braking system;

Fig. 6 is a sectional view on the line 6—6 of Fig. 5;

Fig. 7 is a partial sectional view on the line 7—7 of Fig. 5;

Figs. 8, 9, and 10 are explanatory diagrammatical views.

Figure 2:
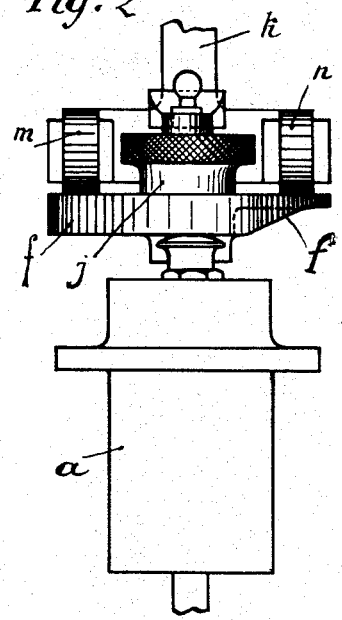
Fig. 2 is an elevational view of the same apparatus.
Figure 1:
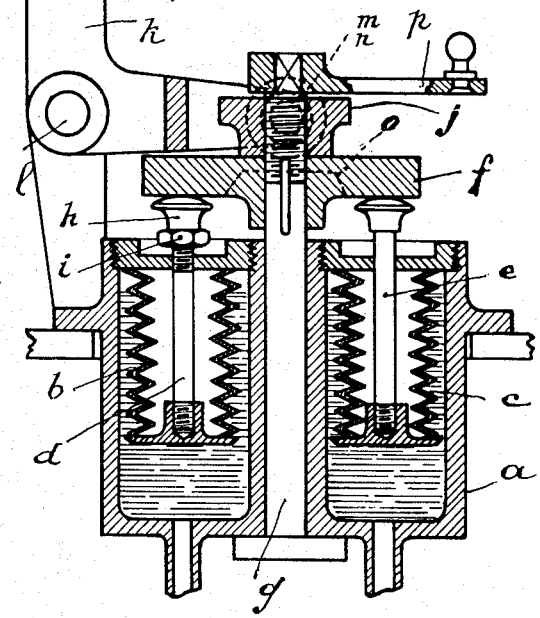
Fig. 1 is a sectional view of the pressure generating apparatus.

In a body $a$ (Figs. 1 and 2), comprising two cylinders, two bellows or pistons $b$ and $c$ are mounted. The rods $d$ and $e$ of these pistons or bellows are actuated by a plate $f$ adapted to slide on a shaft $g$.

Bellows $b$ and $c$ will thus expel a quantity of liquid which is in direct ratio to the amount by which plate $f$ will be depressed. But it is possible to depress one rod more than the other by adjusting a head $h$ which is screwed in the same manner as a bolt on rod $d$ which is threaded for this purpose. Said head $h$ is maintained in position, once it has been correctly adjusted, by a lock nut $i$.

On the other hand, in order to compensate for the wear and tear of the brake linings, it is possible to adjust, besides the position of head $h$, the initial position of rods $d$ and $e$ with respect to their cylinders by screwing milled nut $j$ which bears against plate $f$. The quantity of liquid thus sent into the pipes compresses in the receiving cylinder a bellows similar to the generating bellows and the rod of which moves the brake shoes apart from each other so as to compensate for the wear of the linings.

The braking is controlled through a bent lever $k$ located within easy reach of the pilot and pivoted at a fixed point $l$. Said lever comprises at its other end two rollers $m$ and $n$ which bear against plate $f$.

Consequently, when lever $k$ is rotated in the direction of arrow F, the two rollers depress plate $f$ which in turn depresses the two rods $d$ and $e$. The two bellows $b$ and $c$ are thus caused to expand and drive a certain quantity of liquid in their respective pipes.

Said liquid, when forced into each receiving cylinder, compresses the bellows that is disposed therein and the rod of said bellows brings the brake shoes into contact with the brake drum.

The wheels are therefore simultaneously braked.

Figure 3:
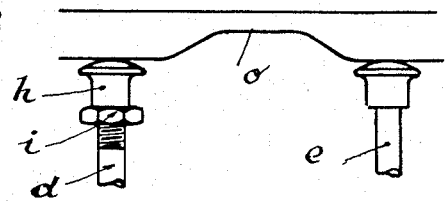
Fig. 3 is a view of a development of the controlling plate of the generator through which the relative adjustment of the brakes is transmitted from the foot-bar.
Figure 4:
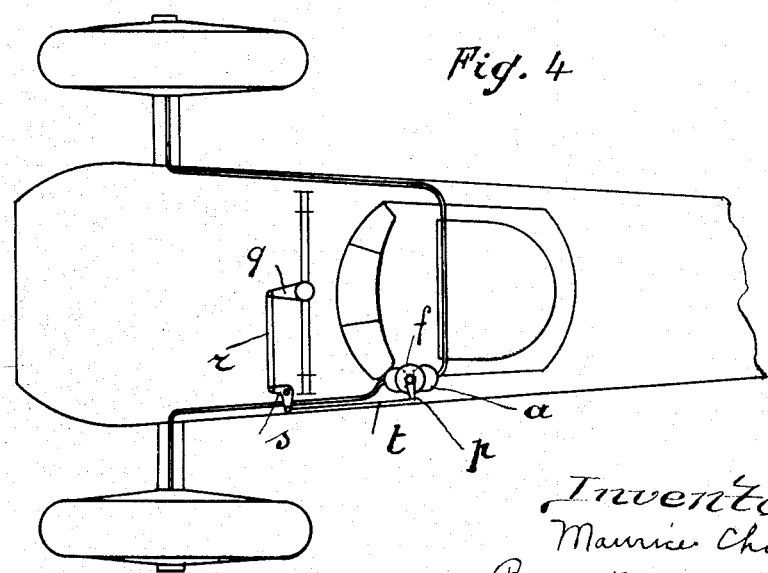
Fig. 4 is a diagrammatical view of my system fitted on an airplane.

On the other hand, plate $f$ is provided with a notch $o$ (Fig. 3) which, in the normal position, is located between the two rods $d$ and $e$ and said plate may rotate together with shaft $g$ on which it is keyed. The rotary movement of the shaft is controlled by means of a lever $p$ (Fig. 1) fitted on the square upper end of shaft $g$. Lever $p$ is actuated by a lever $q$ secured on the flight control foot bar (Fig. 4) through a rod $r$, a bent lever $s$ and another rod $t$ jointed to lever $p$.

When, the airplane rolling on the ground, the pilot acts on the foot bar for causing the airplane to turn, the whole of said levers and rods acts in such manner as to rotate plate $f$ and bring notch $o$ (Fig. 3) opposite one of the rods $d$ or $e$.

If, in that position, the pilot operates lever $k$, he will depress only the rod which is not located opposite notch $o$ and will accordingly brake only the inner wheel with respect to the direction of the turn.

In the other embodiment of the hydraulic braking system according to my invention, as shown in Figs. 5 to 10, the two rods $d$ and $e$ are actuated by a disc $u$ provided with two projections $u^1$ and $u^2$ adapted to engage notches $d^1$ and $e^1$ of the two rods $d$ and $e$ respectively, which prevents any rotary displacement of disc $u$. A thrust ball bearing $v$ is fitted on said disc $u$.

The downward motion of rods $d$ and $e$ through the intermediary of thrust ball bearing $v$ is controlled by a plate $f^0$ playing the same part as plate $f$ of the preceding embodiment. Said plate $f^0$ is keyed on the rod or shaft $g$ upon which bears a roller $w$ carried by the end of a bent lever $k$ pivoted at 1 and which may be rotated in the direction of arrow F. The cam-plate $f^0$ is provided on its under face with two bosses $f^1$ and $f^2$ disposed in line with each other along a diameter of the plate and which have a transverse conical shape as shown in section in Fig. 7 for boss $f^2$, so that the lower generatrix $f^3$ which is common to both bosses makes a certain angle $\alpha$ with cam-plate $f^0$ as shown in Fig. 5. The contact between cam-plate $f^0$ and thrust ball bearing $v$ takes places along said generatrix $f^3$ which coincides with a diameter of the upper ball cage of thrust ball bearing $v$. It will readily be understood that under these conditions said generatrix of contact forms an eventual axis of oscillation for the thrust ball bearing which plays the part of an equalizing bar for balancing the efforts when the braking takes place in the course of a straight line displacement of the airplane, as will be explained hereinafter.

Lastly, cam-plate $f^0$ may be given a rotary motion through a certain angle by means of a lever $p$ which is also keyed on shaft $g$ and is provided at its end with the ball element $p^1$ of a ball and socket joint through which it is articulated to a rod $t$ the displacements of which are controlled by the flight control foot-bar.

The operation of this embodiment of my braking system is as follows:

If it be assumed that the apparatus is in the position shown in Fig. 5 or in Fig. 9, which corresponds to braking while the airplane is turning, that is to say with the foot bar in one of its extreme positions, the generatrix $f^3$ of conical bosses $f^1$ $f^2$ lies in the plane of rods $d$ and $e$. Rod $e$ is depressed, that is to say engaged into its cylinder and the linings of the brake shoes are in contact with the brake drum. On the contrary rod $d$ is in its upper position. If, at this moment, lever $k$ is rotated in the direction of arrow F, only rod $e$ will cause an effective braking of the corresponding wheel or wheels. In the other words, the only wheel or wheels whose brake or brakes are controlled by rod $e$ will be braked and said wheel and wheels will be located on the inner side of the turn.

If the foot-bar is so actuated as to bring it into its middle position (Fig. 8) which corresponds to the braking of the airplane moving in a straight line, the generatrix $f^3$ of bosses $f^1$ and $f^2$ is brought into a plane at right angles to the plane of rods $d$ and $e$. In that case, the thrust ball bearing is inclined from front to rear when looking at the drawing, but its diameter $x$—$x$ is then at right angles to the axes of these two rods $d$ and $e$. Said rods are then at the same level. When lever $k$ is actuated in the direction of arrow F, the downward displacements imparted to these two rods are equal and the two wheels or the two groups of wheels are equally braked.

Finally when the foot-bar is further rotated boss $f^2$ comes to occupy the position first occupied by boss $f^1$ (case of Fig. 10 corresponding to braking while the airplane is turning) and the operation of the parts is the same as in the first case corresponding to Fig. 9, but it is the wheel corresponding to rod $d$ which is the only wheel to be braked.

It will be readily understood that the relative downward displacement of the rods varies in a continuous manner, in such manner that the variation of the braking of one wheel with respect to the other follows exactly the variation of the position of the controlling foot bar.

Furthermore, it will be understood that, in the case of braking when the airplane is moving along a straight line (Fig. 8), thrust ball bearing $v$ may oscillate about generatrix $f^3$, which coincides with a diameter of said thrust ball bearing, so that said bearing balances the efforts transmitted by the two rods, being more or less inclined on the side where the reaction is stronger, in the same manner as an equalizing bar.

It is pointed out that my system can be applied to any device in which it is desired to distribute the efforts between two controlling organs or two pairs of controlling organs for two or more brakes fitted on airplane wheels, whatever the type of said brakes may be.

On the other hand, the system of rods and levers for connecting the generating apparatus to the foot bar has been described merely by way of example and might be arranged in any other suitable manner.

In a general way, while I have disclosed what I deem to be preferred embodiments of my device, it should be well understood that I do not wish to be limited thereto as there might be changes made in the arrangement, disposition and form of the parts without departing from the principle of my invention as comprehended within the scope of the appended claims.

What I claim is:

1. A hydraulic braking system for airplanes which comprise in combination, two braking pressure generating means, each corresponding to one side of the airplane respectively, two parallel sliding rods, one for each pressure generating means, a plate for operating said rods having a cam shaped under face, means for causing said plate to move in a direction parallel to said rods, and means for rotating said plate whereby the action exerted by said plate on the two rods is no longer equal, a rudder foot bar, and articulated means for connecting said foot bar to said plate so that the rotary motion of said plate is controlled by said foot bar.

2. A hydraulic braking system for airplanes which comprises in combination two parallel cylinders connected separately to the braking systems on either side of the airplane respectively, two pressure generating organs adapted to move in said cylinders respectively, two parallel rods for operating said organs respectively, a plate for operating said rods having a cam shaped under face, means for causing said plate to move in a direction parallel to said rods, means for rotating said plate whereby the action exerted by said plate on the two rods is not the same for both, a rudder foot bar and articulated means for connecting said foot bar to said plate so that the rotary motion of said plate is controlled by said foot bar.

3. A hydraulic braking system for airplanes which comprises in combination, two parallel cylinders connected separately to the braking systems on either side of the airplane respectively, two bellows adapted to move in said cylinders respectively, two parallel rods for operating said bellows respectively, a plate for actuating said rods having a cam shaped under face, means for causing said plate to move in a direction parallel to said rods, means for rotating said plate whereby the action exerted by said plate on the two rods is not the same for both, a rudder foot bar, and articulated means for connecting said rudder foot bar to said plate so that the rotary motion of said plate is controlled by said foot bar.

4. A hydraulic braking system for airplanes which comprises in combination, two braking pressure generating means each corresponding to one side of the airplane respectively, two parallel sliding rods, one for each pressure generating means, adapted to control said means, a shaft, a plate for operating said rods having its under side provided with a notch, said plate being slidably mounted on said shaft but adapted to rotate therewith, a lever for causing said plate to move in a direction parallel to said shaft, means for rotating said plate whereby the notch in the plate may be brought above one of the rods and the action exerted on the two rods is no longer the same for both, a rudder foot bar, and articulated means for connecting said foot bar to said plate so that the rotary motion of said plate is controlled by said foot bar.

5. A hydraulic braking system for airplanes which comprises in combination, two braking pressure generating means each corresponding to one side of the airplane respectively, two parallel sliding rods, one for each pressure generating means, adapted to control said rods, means for adjusting the length of one of said rods, a shaft, a plate for operating said rods having its under side provided with a notch, said plate being slidably mounted on said shaft but adapted to rotate therewith, a lever for causing said plate to move in a direction parallel to said rods, means for rotating said plate whereby the notch in the plate may be brought above one of the rods and the action exerted on the two rods is no longer the same for both, a rudder foot bar and articulated means for connecting said foot bar to said plate so that the rotary motion of said plate is controlled by said foot bar.

6. A hydraulic braking system for airplanes which comprises in combination, two parallel cylinders connected separately to the braking systems on either side of the airplane respectively, two pressure generating organs adapted to move in said cylinders respectively, two parallel rods for operating said organs respectively, a plate for operating said rods having a cam shaped under face adapted to cooperate with the upper ends of said rods, means for causing said plate to move in a direction parallel to said rods, means for adjusting the initial position of said plate with respect to said cylinders, means for rotating said plate whereby the action exerted by said plate on the two rods is not the same for both, a rudder foot bar, and articulated means for connecting said foot bar to said plate so that the rotary motion of said plate is controlled by said foot bar.

7. A hydraulic braking system for airplanes which comprises in combination, two braking pressure generating means, each corresponding to one side of the airplane respectively, two parallel sliding rods, one for each pressure generating means, adapted to control said pressure generating means, a shaft, a plate for operating said rods having its under side provided with a notch, said plate being slidably mounted on said shaft but adapted to rotate therewith, a bent lever, two rollers mounted at one end of said lever bearing upon the upper face of said plate for causing said plate to move in a direction parallel to said rods, means for rotating said plate whereby the notch in the plate may be brought above one of the rods so that said rod is not operated by the plate, a rudder foot bar, and articulated means for connecting said foot bar to said plate whereby the rotation of the plate is controlled by said foot bar.

8. A hydraulic braking system for airplanes which comprises in combination, two braking pressure generating means, each corresponding to one side of the airplane respectively, two parallel sliding rods, one for each pressure generating means, adapted to control said means, and provided with a notch at their upper ends, and annular disc, two diametrally opposite projections on the under side of said disc adapted to engage said notches, a thrust ball bearing on the upper face of said disc, a shaft extending through the central part of said disc, a plate rigidly secured to said shaft having a cam shaped under surface adapted to cooperate with the upper part of said thrust ball bearing, means for giving said shaft a sliding motion parallel to said rods, means for rotating said shaft about its axis, a rudder foot bar and means for conecting said foot bar to said means for rotating the shaft whereby the rotation of said shaft is controlled by said foot bar.

9. A hydraulic braking system for airplanes which comprises in combination, two braking pressure generating means, each corresponding to one side of the airplane respectively, two parallel sliding rods, one for each pressure generating means, adapted to control said means and provided each with a notch at its upper end, an annular disc, two diametrally opposite projections on the under side of said disc adapted to engage said notches respectively, a thrust ball bearing on the upper face of said disc, a shaft extending through the central part of said disc, a plate rigidly secured to said shaft, two bosses on the under face of said plate adapted to engage the upper face of said thrust ball bearing, said bosses being part of one conical surface having its axis in a diametral plane of said plate, means for giving said shaft a sliding motion parallel to said rods, a lever for rotating said shaft about its axis whereby said shaft can exert a differential action on said rods, a rudder foot bar, and means for connecting said foot bar to said lever whereby the rotation of said shaft is controlled by said foot bar.

In testimony whereof I have signed this specification.

MAURICE CHARLES.